Oct. 10, 1961 G. E. KLOOTE ET AL 3,003,810
PLASTIC TRUCK BODY CONSTRUCTION
Filed Feb. 2, 1956 4 Sheets-Sheet 1
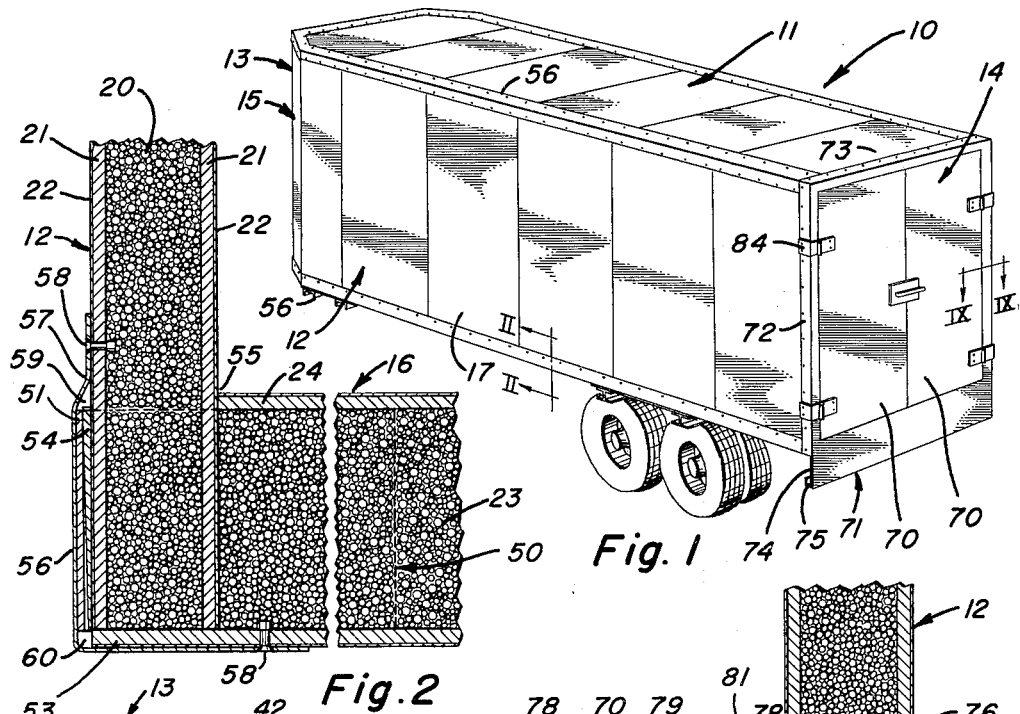
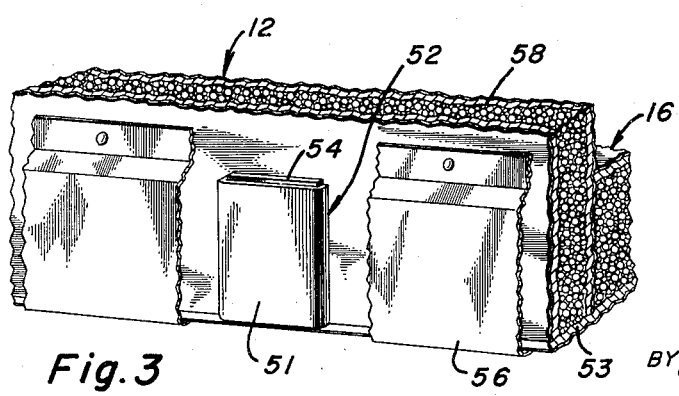
INVENTORS
GEORGE D. MEIER
GEORGE E. KLOOTE
JOSEPH A. POTCHEN
BY
ATTORNEY

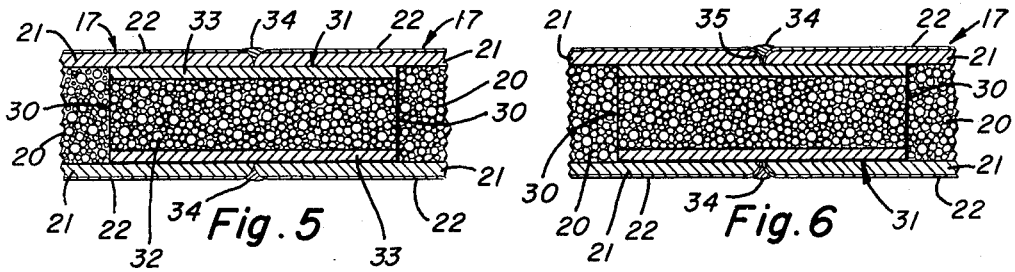
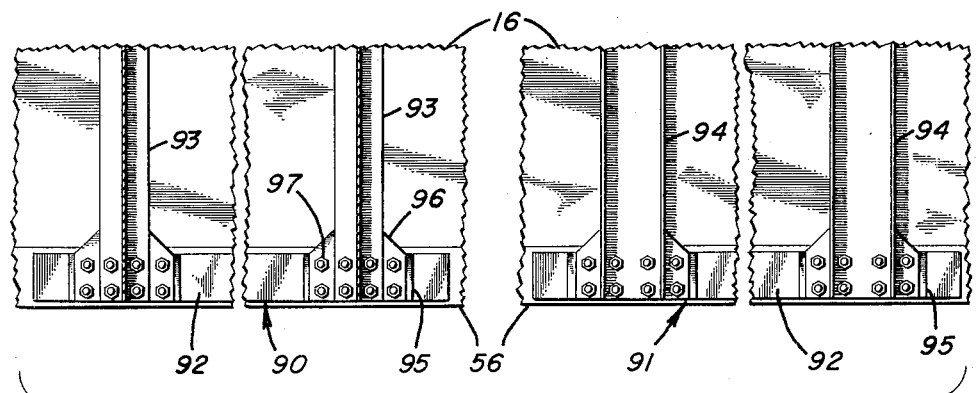
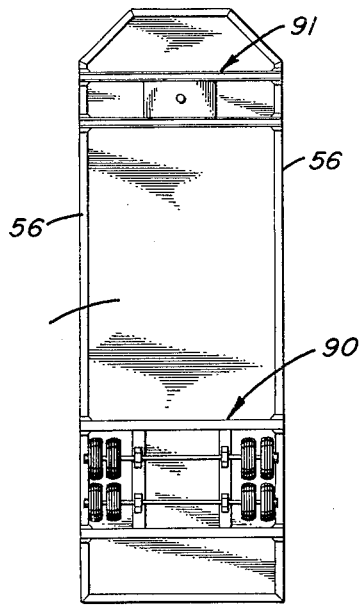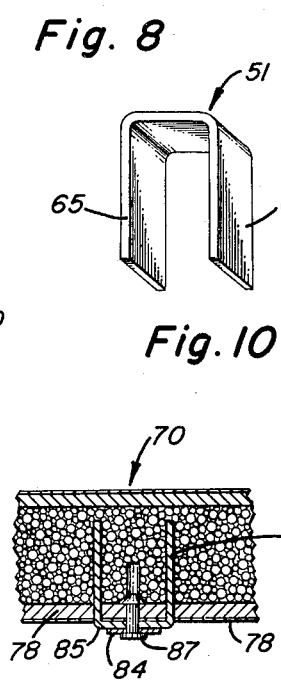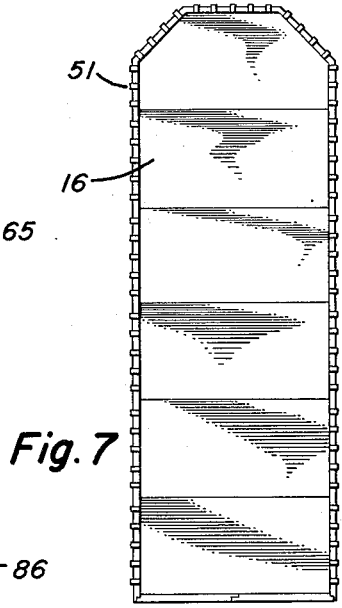
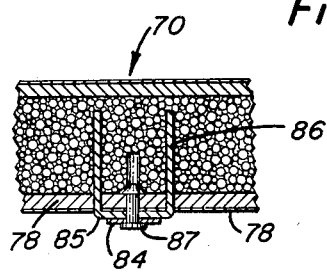
INVENTORS
GEORGE D. MEIER
GEORGE E. KLOOTE
JOSEPH A. POTCHEN
BY
ATTORNEY

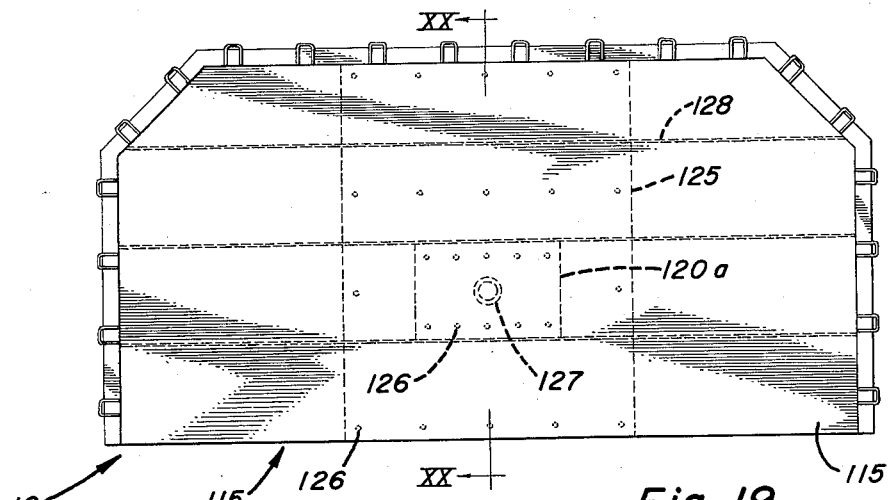
Fig. 19
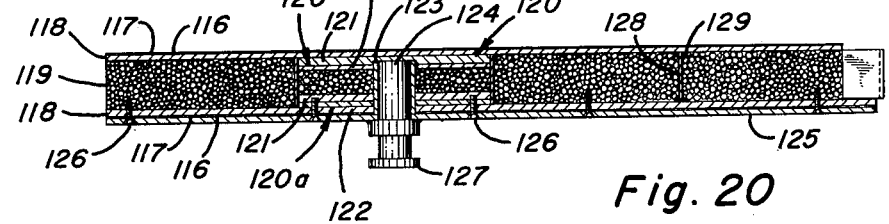
Fig. 20
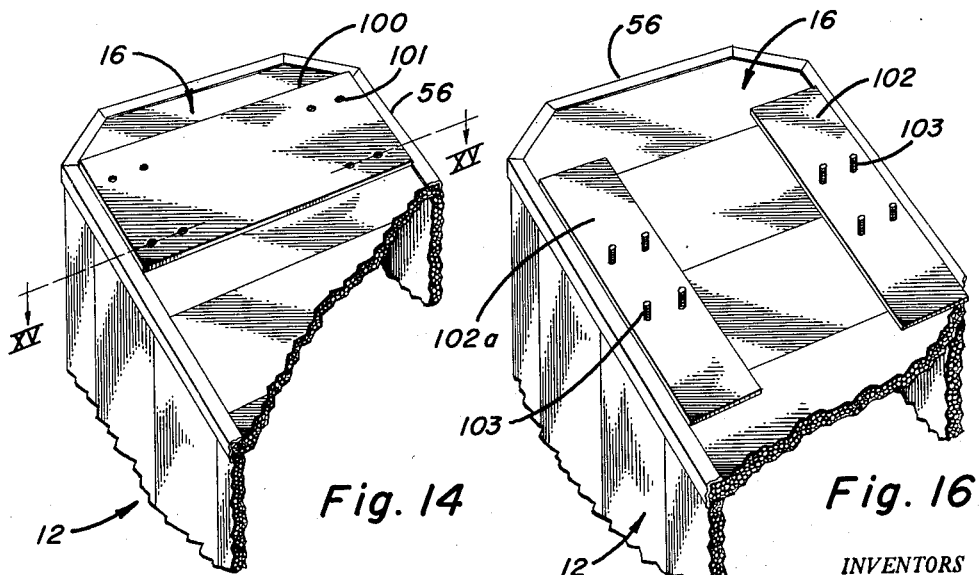
Fig. 14
Fig. 16
INVENTORS
GEORGE D. MEIER
GEORGE E. KLOOTE
JOSEPH A. POTCHEN
BY
ATTORNEY

3,003,810
PLASTIC TRUCK BODY CONSTRUCTION

George E. Kloote, Grand Rapids, Joseph A. Potchen, Marne, and George D. Meier, Grand Rapids, Mich., assignors, by mesne assignments, to Evans Products Company, Plymouth Township, Mich., a corporation of Delaware
Filed Feb. 2, 1956, Ser. No. 562,972
5 Claims. (Cl. 296—31)

This invention relates to vehicle bodies and more particularly to a vehicle body constructed substantially entirely of synthetic resin materials.

This application is a continuation-in-part of our copending application entitled Improvement in Refrigerated Areas, Serial No. 484,948, filed January 31, 1955, now United States Patent No. 2,896,271, issued July 28, 1959.

A vehicle body such as that of a truck or trailer, irrespective of its purpose or design, constructed of these materials has many advantages. It is substantially lighter than vehicle bodies constructed of conventional materials such as aluminum or steel or a combination of wood and metal. The difference in weight is substantial and results in the vehicle's having a substantially greater pay load capacity. Thus, its earning capacity is materially increased. This is particularly true where this type of construction is used without any of the conventional supporting frame structure. The strength of the material is such that this may be done.

An important advantage of this type of material for the construction of vehicle bodies is its thermal insulating characteristics. Materials of this type, particularly where the core is of a low density, foamed, synthetic resin such as a polystyrene, polyisocyanate of phenolic foam are characterized by a thermal insulating factor quite comparable to that of cork without the disadvantages of cork. It, thus, provides a highly desirable material for the fabrication of vehicle bodies for refrigerated units.

Heretofore there has been no satisfactory material for this purpose. Existing constructions using sheet or ground cork or filamentary glass lose their thermal insulating characteristics rapidly due to the condensation and accumulation of moisture. Further, the collection of moisture in the thermal insulation results in rapid deterioration of the structure due to rot, fungus and corrosion. It also results in a substantial increase in the weight of the vehicle resulting from its total moisture content. The synthetic resin materials which are the subject of this invention are both substantially non-permeable to moisture and are non-hygroscopic. Therefore, the tendency of these materials to collect moisture is, for all practical purposes, negligible.

Furthermore, the panels from which the vehicles are constructed are effective moisture barriers through which moisture cannot migrate. The material has a distinct advantage in this respect over any previous material since even a puncture resulting in partial penetration of the material will not destroy its moisture barrier characteristics. Where attempts have been made to render prior materials tight against the migration of moisture, it has been accomplished by a thin surface film which, when ruptured, permitted the moisture to migrate freely through the panel. This condition is entirely eliminated by this invention.

The material is not subject to delamination. This results, in part, from the nature of the adhesives employed to laminate the materials. Also, the materials being non-hygroscopic and non-permeable to moisture, there is little tendency for the moisture to travel along the planes of the adhesive bonds by capillary action to create hydraulic, delaminating pressures. This gives the material durability and a high factor of permanence.

Since the material is not subject to corrosion, rot or to the collection of moisture, the necessary joints in the vehicle body have no tendency to separate. The joints of this invention are formed by adhesives rather than by conventional fasteners. The elimination of fasteners eliminates the problem of loosening under vibration. It also eliminates wear on the bearing surfaces adjacent the fasteners such as frequently occurs with screws and bolts. This materially adds to both the strength and durability of the resulting vehicle.

The major portion of the materials of the panels used in this invention are wholly resistant to rot and corrosion. They are also resistant to attack by vermin and fungus. This eliminates a major portion of replacement and maintenance costs. In addition, it permits the structure to maintain its original strength for a substantially longer period.

Another major advantage of this type of construction is its lower initial cost. The nature of the material permits the heavy, sub-frame structure to be eliminated with all of the loads being absorbed by the body structure alone. This contributes materially to a reduction of the initial material and labor costs.

The structure is comparatively easy to assemble. Its light weight requires less handling equipment and smaller handling crews. The material is adapted to fabrication and assembly in large units. This reduces the number of operations involved in assembly and it eliminates a multitude of small components which, collectively, are expensive and involve many hours of direct labor for installation. The materials are joined by adhesives. These are faster and easier to apply than such fasteners as screws, bolts, rivets and similar conventional items. The complexity and number of the tools necessary to fabricate vehicles of this material are less. While the materials themselves may be somewhat higher in cost than any of the conventional materials used for vehicle construction, this higher cost is more than offset by the lower labor costs and the greatly reduced time element involved in their assembly into a completed unit.

The vehicles built of this material are easy to repair. Repairs can be made simply by removing damaged portions by severing them from the structure by a router, saw or similar tool. A wholly new section may then be adhesively bonded into place without loss of strength, moisture resistance or thermal insulation.

Other factors beside the material's durability contribute to its low maintenance cost. The materials have a hard, non-absorbent and non-pervious surface, permitting them to be readily cleaned. Further, in many cases, cleaning materials may be used to remove resistant stains and types of dirt which are too corrosive for more conventional materials.

Vehicles constructed of this material are resistant to injury should the contents of articles in transit be spilled, such as sulphuric acid, vegetable and animal acids and dyes and other injurious materials commonly encountered in transportation. The material can be made readily resistant to puncture and indentation, far more so than such materials such as plywood or metals. The material is characterized by its ability to absorb shock loads such as those forming punctures and indentations. The material's surface is highly resistant to fracture, craze or other failure. This makes the material far more durable in service.

The materials are adapted to stressed skin construction in which the loads imposed upon the structure are uniformly and widely distributed. This prevents the creation of concentrated stress loadings at certain points in the structure. This, in itself, contributes substantially to the elimination of operational failure and to the added life of a vehicle.

The materials are adapted to permanent coloring, eliminating the necessity for frequent painting. They can also be made fire resistant, at least to the extent that they will not support combustion. Except for metals, no such material suitable to vehicle construction is currently known since fire resistant materials, as a whole, are much too brittle to withstand the shock and vibration stresses imposed upon vehicle bodies. This characteristic reduces the fire hazard and contributes to the safety both of the operators and of the materials in transit.

These and other objects and purposes of this invention will be understood by those acquainted with the design and construction of vehicle bodies upon reading the following specification and the accompanying drawings.

In the drawings:

FIG. 1 is an oblique view of a semi-truck trailer constructed according to this invention.

FIG. 2 is a fragmentary, enlarged, sectional elevation view taken along the plane II—II of FIG. 1.

FIG. 3 is a fragmentary, broken, oblique view of the joint shown in FIG. 2.

FIG. 4 is a fragmentary, sectional view taken in a horizontal plane through the joints between the front and side walls of the vehicle.

FIG. 5 is a fragmentary, horizontal, sectional view of a typical panel joint for tandemly aligned panels.

FIG. 6 is a view similar to FIG. 5 but showing a modification of the joint appearing in FIG. 5.

FIG. 7 is a plan view of the vehicle floor before installation of the side, front and rear walls.

FIG. 8 is an enlarged, fragmentary, broken bottom view of the means for attaching the frames for the wheel bogey and the fifth wheel to the body structure.

FIG. 9 is a fragmentary, horizontal, enlarged sectional view of the rear corner of the vehicle body taken along the plane IX—IX of FIG. 1.

FIG. 10 is an oblique view of one of the anchor members used to join the side walls to the roof and floor.

FIG. 11 is a bottom view of a vehicle body with the fifth wheel and wheel bogey frame attached.

FIG. 12 is a fragmentary, sectional view of the hinge mount taken along the plane XII—XII of FIG. 9.

FIG. 14 is a fragmentary, oblique view of the forward end of the bottom surface of the body.

FIG. 16 is a fragmentary, oblique view of the forward end of the bottom surface of the body, illustrating a modified means of attaching the fifth wheel frame.

FIG. 19 is a bottom view of another structure for mounting the fifth wheel frame.

FIG. 20 is a fragmentary, sectional view taken along the plane XX—XX of FIG. 19.

Figure 13:
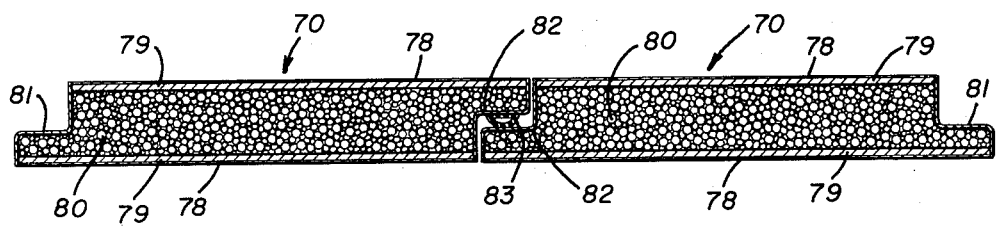
FIG. 13 is a sectional view taken horizontally through the rear doors of the body.

In the following description the terms "forwardly" and "rearwardly" as used are to be taken to mean "forwardly" toward the front end of the vehicle as it is normally operated on the road or to the left in FIG. 1 and "rearwardly" oppositely thereof. The terms "inwardly" and "outwardly" are to be taken to mean "inwardly" toward the geometric center of the vehicle and "outwardly" away therefrom.

In executing the objects and purposes of this invention there has been provided a vehicle body which, for the purposes of illustration, is shown to be a truck semi-trailer constructed as a shell of adhesively joined, modular, synthetic resin panels. These panels have a filament reinforced, synthetic resin facing skin and a core of a low density, foamed synthetic resin such as polystyrene. Between the skins and the core there may be provided a puncture resisting, sublamina to increase the panel's resistance to indentation and puncture resulting from the impact of sharp objects.

In its preferred form, the invention contemplates the vehicle structure being constructed as a stressed shell in which the primary loads are carried entirely by the shell structure and in which all primary or secondary framing both on the sides and underneath is entirely eliminated.

Referring specifically to the drawings, the numeral 10 indicates a trailer body having a roof 11, sides 12, a front 13, a back 14 and, in the particular construction illustrated, front corner panels 15. The latter are more clearly seen in FIG. 4. In addition to the above structure, the body includes a floor assembly 16 (FIGS. 2, 3 and 7).

The floor, sides, front and roof are all assembled from modular panel units adhesively joined together as will be explained more fully hereinafter. The front corner panels are similar in construction to the individual panels of the walls of the body. Except for the matter of thickness, the individual panels from which each of these assemblies is built are similar. Thus, referring to FIG. 2, a typical panel 17 for one of the sides 12 consists of a central core 20 to each face of which is intimately, adhesively bonded a puncture resisting, rigid sublamina 21. The exposed face of each of the sublamine is covered by a structural skin 22. The core 20 may be of any suitable type, light weight, low density, cellular material.

One such material is a foamed polystyrene such as those made by polymerizing a hydrocarbon or halo-hydrocarbon having a vinyl radical on an aromatic nucleus and including the products resulting from polymerization of styrene, monomethylstyrene and di-methylstyrene, vinyl-naphthalene and a halogenated styrene. Such foamed core materials normally have a density in the range of 2 to 10 pounds per cubic foot. The core may be of a foamed in situ, reaction product of a polyisocyanate and a suitable polyester or alkyd resinous composition. An example of such a polyisocyanate is a meta-toluene-diisocyanate. This latter is but an exemplification because other aromatic polyisocyanates can be employed quite satisfactorily.

Another material which may be used for the core is any of the several foamed phenolic resins. Various other resins may be expanded or foamed to produce a low density, closed cell structure suitable for use as a core material for these panels.

The particular choice of the materials outlined above is dictated in part by their low density and in part by their sealed, cell structure. The sealed, cell structure gives the material the characteristics of non-perviousness to moisture and effective thermal installation. It is important that the resutling foam be rigid because, as will be more fully understood later in this description, the core material must act as the rigid web member of a beam when considered in cross section.

It is also desirable to choose a foam material which itself is either characterized by or has incorporated into it constituents rendering it non-flammable. At least it should be a material which will not sustain combustion. This is important in reducing or eliminating the fire hazard attendant the use of the ultimate equipment. It will be understood, particularly in the field of polyisocyanates, that various materials may be added to the original reaction mixture to change the characteristics of the core material to fit the particular circumstances under which the vehicle is to be used. Such materials can increase the non-flammable characteristics of the material, increase rigidity or influence its effective thermal operating range. These modifications, however, do not affect the basic concept of the use of the panel in such a manner that the core serves as a structural web, as a thermal insulator and as a vapor barrier.

The sublaminae 21 are of high density and normally are applied, among other reasons, to increase the panel's resistance to surface indentation such as would be caused by crushing loads or high impact forces. While the low density core materials, particularly the foamed, synthetic resin materials of the inner core 12, have sufficient resistance to crushing loads for many applications, their failure point, in compression, is below that necessary where the panels are applied as flooring or where heavy or sharp objects are likely to strike the panel with appreciable force. As applied in these panels, the high density laminae serve both to resist penetration by such forces and to distribute concentrated loads over a wide area so that the ultimate compressive strength of the low density core 20 is not reached.

The sublaminae 21 may be of a high density, foamed polystyrene or a high density, foamed polyisocyanate or they may be of a totally different material such as plywood or a ligneous hardboard such as that sold under the trademark "Masonite." Other possible materials for a puncture resisting, sublamina include the fibrous hardboards such as panels consisting of mineral fibers bonded with a synthetic resin or a cementitious binder.

Normally, the sublaminae 21 are of plywood because of its high tensile strength which when combined with other components of the panels materially increases the strength of the panels. This plywood may be of either hardwood or softwood.

The facing skins 22 are of a hard, impervious, resin material which may be securely bonded to the sublaminae 21 by any suitable resin characterized by adhesive properties, high bonding strength and in which the facing sheet is not readily soluble. A suitable resin for manufacture of the facing skins is one of the numerous, commercially available polyester resins. The facing skins are normally reinforced with a fibrous material such as filamentary glass in which the filaments are either oriented or arranged at random. Preferably a woven filamentary glass web is used for reinforcement. Such facing skins, when cured, have a thickness normally within the range of 0.015 to about 0.060 of an inch. The facing skins 22 may be of the same thickness or of different thicknesses, depending upon the particular requirements of the installation in which the structure is to be used.

For purposes of illustration of this invention, the skins 22 are reinforced by a woven filamentary glass which may constitute as much as one-half of the thickness of a skin of approximately 0.032 of an inch in thickness. Such a skin has good load transmitting characteristics both in shear and in tension in all directions. Again, for purposes of illustration, the sublaminae will be considered as consisting of one-eighth inch thick three-ply plywood. This, however, is to be considered only as exemplary and is not to be taken in any way as a limitation upon the scope of the invention.

It will be understood from this description that such a panel, considered in cross section as a primary load carrying member, acts as an I-beam under bending and torsional loadings with the skins acting as the primary load carrying elements and the core serving as a web acting in shear. The skins 22, when intimately bonded to a supporting medium, whether it be the core or the sublaminae 21, are particularly suited to serve as primary tension and compression members. The low density, foamed, synthetic resin core materials are characterized as good load carrying members when the loads act in shear. Therefore, whether the loads are considered as acting vertically, horizontally or in any other direction with relation to the panels, this I-beam effect makes the panels primary load carrying members, quite capable of utilization as primary structure in the total absence of any auxiliary, supporting framework.

One important function of the sublaminae is that of preventing penetration or indentation of the panels. In this capacity the plywood sublaminae co-operate with the facing skins when the two are intimately bonded together. The high Young's modulus of the filamentary glass reinforced, polyester resin facing sheets in co-operation with the wood sublaminae produces a highly satisfactory resistance to indentation. A three inch sphere striking a panel having a 2 pound density foamed polystyrene core, a 0.125 inch hardwood, plywood sublamina and a 0.018 inch facing sheet with an ultimate impact force of 38 foot pounds produced an indentation of 0.21 of an inch. This impact was produced by a drop test on a panel backed up with a cement floor.

The addition of the rigid sublaminae 21 also contributes to the structural strength of the panel. This contribution is substantial as is indicated by comparison of the values appearing in the following tables:

TABLE I

PANEL WITH 2 POUND DENSITY STYROFOAM CORE AND TWO .018 FACES

| Total thickness of panel, in inches | Weight per square, foot-pounds | Maximum[1] bending moment, inch-pounds | EI,[1] inches-pounds | Maximum shear, pounds | K[2] factor |
|---|---|---|---|---|---|
| 1 | .50 | 149 | 27,900 | 22.9 | .24 |
| 2 | .67 | 298 | 111,800 | 45.8 | .12 |
| 3 | .83 | 446 | 251,000 | 68.7 | .08 |
| 4 | 1.00 | 595 | 446,000 | 91.6 | .06 |

See footnotes at end of table II.

TABLE II

PANEL SAME AS TABLE I WITH ⅛" HARDWOOD PLYWOOD SUBLAMINAE

| Total thickness of panel, in inches | Weight per square, foot-pounds | Maximum[1] bending moment, inch-pounds | EI,[1] inches-pounds | Maximum shear, pounds | K[2] factor |
|---|---|---|---|---|---|
| 1¼ | 1.48 | 1,912 | 205,811 | 55.0 | .22 |
| 2¼ | 1.64 | 3,612 | 734,301 | 110.0 | .11 |
| 3¼ | 1.81 | 5,312 | 1,587,997 | 165.0 | .07 |
| 4¼ | 1.98 | 7,012 | 2,767,012 | 220.0 | .06 |

[1] Values for bending moment, shear and EI are based on 1 inch width.
[2] Thermal conductivity expressed in B.t.u.'s per square foot, per hour, per degree Fahrenheit of temperature differential.

A further comparison of the strength of these two types of constructions appears by comparison of the deflection resulting from loading appearing in Tables III and IV. In these tables the maximum deflection is expressed in inches when the panel is treated as a simple beam supported at each end and subjected to a uniformly distributed load of 10 pounds per square foot.

TABLE III

PANEL WITH 2 POUND DENSITY STYROFOAM AND TWO .018 FACES

| Span in inches | Thickness in inches | | | | |
|---|---|---|---|---|---|
| | 1 | 2 | 3 | 4 | 6 |
| 12 | .00178 | .00070 | .00044 | .00032 | .00022 |
| 48 | .190 | .0518 | .0250 | .0152 | .0078 |
| 72 | .911 | .237 | .110 | .064 | .0428 |
| 96 | 2.823 | .722 | .330 | .190 | .088 |
| 120 | 6.831 | 1.732 | .784 | .448 | .205 |

TABLE IV
PANEL SAME AS TABLE III WITH TWO 1/8" HARDWOOD PLYWOOD SUBLAMINA

| Span in inches | Thickness in inches | | | | |
|---|---|---|---|---|---|
| | 1¼ | 2¼ | 3¼ | 4¼ | 6¼ |
| 12 | .000699 | .000348 | .000228 | .000179 | .000118 |
| 48 | .0343 | .0121 | .00666 | .00450 | .00263 |
| 72 | .143 | .0455 | .0235 | .0150 | .00812 |
| 96 | .417 | .127 | .0629 | .0388 | .0200 |
| 120 | .980 | .289 | .141 | .8050 | .0422 |

The strength of the panels may also be compared in the ultimate load capacities of the panels. In the following Tables V and VI the ultimate values are expressed in pounds per foot width of beam with the beam supported at each end and the load uniformly distributed.

TABLE V
PANEL WITH 2 POUND DENSITY STYROFOAM AND TWO .018 FACES

| Span in inches | Thickness in inches | | | | |
|---|---|---|---|---|---|
| | 1 | 2 | 3 | 4 | 6 |
| 12 | 550 | 1,100 | 1,650 | 2,200 | 3,300 |
| 48 | 550 | 1,100 | 1,650 | 2,200 | 3,300 |
| 72 | 540 | 1,080 | 1,622 | 2,160 | 3,240 |
| 96 | 406 | 812 | 1,220 | 1,624 | 2,436 |
| 120 | 325 | 650 | 976 | 1,300 | 1,949 |

TABLE VI
PANEL SAME AS TABLE V WITH TWO 1/8" HARDWOOD PLYWOOD SUBLAMINA

| Span in inches | Thickness in inches | | | | |
|---|---|---|---|---|---|
| | 1¼ | 2¼ | 3¼ | 4¼ | 6¼ |
| 12 | 1,320 | 2,640 | 3,960 | 5,280 | 7,920 |
| 49 | 1,320 | 2,640 | 3,960 | 5,280 | 7,920 |
| 72 | 1,320 | 2,640 | 3,960 | 5,280 | 7,920 |
| 96 | 1,320 | 2,640 | 3,960 | 5,280 | 7,920 |
| 120 | 1,320 | 2,640 | 3,960 | 5,280 | 7,920 |

The values above the double line in Table V and all the values in Table VI indicate ultimate loading with failure due to shear.

It will be noted from Tables I and II that the addition of the plywood sublaminae does not adversely affect the thermal insulating qualities of the panels. This is particularly important where the panels are used in the construction of refrigerated vehicles.

It will be recognized from the above description that the adhesives used to bond the various laminae into an integral unit must be characterized by high strength, under both shear and tension loadings, and should be, for all practical purposes, insoluble in water, non-pervious to water and non-hygroscopic.

A suitable adhesive for this purpose is an epoxy resin adhesive hardenable at ambient or moderately elevated temperatures and under only sufficient pressure to assure firm contact between the facing sheet and the core during the curing period. This adhesive is a liquid partially polymerized, high molecular weight, reaction product of a diphenol and an epoxy compound. One example of such a reaction product is that obtained by heating together 2,2"-bi (4-hydroxyphenyl propane) and epichlorhydrin in the presence of an alkali such as sodium hydroxide, whereby there are formed polymeric glycidyl polyethers of the phenolic substance having properties and an average molecular weight depending upon the reaction conditions and the proportions of the reactants employed. This is merely an example of one particular adhesive and it will be recognized that various other materials may be used without in any way affecting this invention.

Some contact resins may be used as substitutes for the epoxy resins as the bonding adhesive of the various panel laminae. The contact adhesives used for this purpose must be of a type which will adhere strongly to themselves even after evaporation of the carrier, whether it is water or a solvent. The escape of the carrier presents a serious problem in these panels if joinder of the laminae is attempted before escape of the carrier. Where only the foamed resin core and synthetic resin facing skins are used the vapor impervious character of these materials will prevent escape of the carrier and the setting of the adhesive. The absorbent character of the wood sublaminae will permit escape but the carriers will become trapped in the sublaminae to the detriment of the physical characteristics of the panels.

Among suitable contact type adhesives for this purpose is one having a synthetic rubber base and containing a solvent and methyl-ethyl-ketone. The water dispersion type of adhesive may also be employed.

The use of an epoxy type or contact adhesives provides a panel which is not subject to delamination due to failure of the bonding material. Further, these adhesives provide bonds which are unaffected even by long submersion in water or by contact with many corrosive chemicals.

The structure of the panels used for assembling the various units of the vehicle body is identical to that of the wall panel described above. The overall thickness of the panel, however, may vary, depending upon the anticipated stress loading. Thus, the panels of the floor assembly 16 may be substantially thicker than those of the wall or roof assemblies. In this case, the added thickness is obtained by a substantially thicker core 23. This, in effect, increases the height of the web of the I-beam, thus, increasing its moment of inertia. Also, in the panels of the floor assembly 16, the thickness of the top sublamina 24 may be somewhat increased to withstand the type of concentrated, compression loads which may be expected such as those resulting from the wheels of a fork truck passing over the surface.

The various panels making up the roof 11, sides 12, front 13 and floor 16 are all similarly assembled. Various joint structures may be used for this purpose. However, FIG. 5 illustrates one particular joint structure suitable for this purpose. For purposes of illustration, it will be assumed that two side panels 17 are joined. These side panels each have a core 20, a pair of sublaminae 21 and a pair of surface skins 22. At the abutting edges of the panels, a portion of the cores 20 are either omitted or are removed by suitable means such as routing. This forms a pocket 30 in each of the panels, undercutting the sublaminae 21. The pockets 30, together, are designed to receive a spline 31 bridging the joint. While the spline 31 may have various constructions each capable of providing adequate joint strength, the particular spline illustrated includes a core 32 of a material identical to the cores 20 except that, in some cases, it may be somewhat denser. To each face of the core 32 there is bonded a lamina 33 of plywood, hardboard or of a polyester resin, glass fiber reinforced material similar to that used as the skins 22. In the particular illustration, the surfacing laminae 33 are considered to be of plywood.

Before the spline 31 is installed, the walls of the pockets 30 are coated with the same type of epoxy adhesive as that used for fabricating the panels themselves. While the adhesive is in a flowable state, the spline is inserted and the panels are pushed together and are allowed to remain until the resin sets. This type of spline will receive its major loading in shear at the joint between its surface lamina 33 and the sublamina 21. This loading will be in shear and, therefore, will permit both the panels and the spline to develop their maximum strength characteristics. This type of joint provides a splice of sufficient strength to transmit the full loading factor for which the panels themselves are rated.

The contact adhesives described in connection with the fabrication of the panels are not adapted to uses such as the bonding of the splines to the panels. When the carrier has escaped, the contact adhesives do not permit a sliding displacement between the parts once contact has been established. Thus, they would not permit installation of the splines in the pockets.

The ends of the surface skins 22 and of the sublaminae 21 of both panels are rounded, forming a somewhat V-shaped pocket. These pockets are filled with a bead 34 of an epoxy resin similar to that used for installing the spline. The beads 34 serve several purposes. They assure a smooth surface for the joint. They provide a positive seal against moisture migration at the joint and against moisture contact with the sublaminae 21 should these be of a moisture previous or hygroscopic material. The beads 34 also protect the edges of the panel against mechanical injury, since they fill any gap through which a foreign object might enter and get under the surface laminations of the panel to tear them from the panel. The beads 34 will also transmit some loads in both tension and shear from one panel to the other. This, however, is not considered a particularly important phase of their function.

To render the epoxy resins more useful for purposes such as the formation of the beads where flow is not desirable, the viscosity of the epoxy resins may be increased by loading them with suitable bulking or extending materials. These materials are generally known as extenders and include among others calcium carbonate, magnesium silicate, aluminum silicate, silica and diatomaceous earth. The extender may consist of one of these materials, however, it is more commonly a mixture of several. By controlling the quantity of the extender added to the resin, the viscosity of the resin adhesive can be closely controlled. Thus, it may be given a consistency such that it may be spread as a paste-like substance or forced into a cavity such as that in which the beads 34 are formed, in a manner similar to the application of a caulking compound.

The joint illustrated in FIG. 6 is identical to that illustrated in FIG. 5 except that at the edge of each of the panels, the sublamina 21 is rounded before assembly to the facing skin 22. The end of the facing skin 22 is then formed over the rounded end of the sublamina and extends inwardly to the bottom of the pocket 30. This construction, although somewhat more difficult to fabricate, has the added advantage of positively protecting the ends of the skins against the possibility of mechanical injury. Once again, the pocket between the ends of the panels is filled with a bead 34 of the epoxy resin or any other suitable material having the desired mechanical and chemical characteristics.

FIG. 4 illustrates the joint structure employed where the front corner panels 15 are secured to the side and front panels 11 and 13 respectively. In this case, each end of the corner bridging panel 15 has the core shaped to provide a deep groove or channel 40 outwardly of which is a tongue 41. While many variations may be made in the particular shape of the tongue and channel, they are preferably designed to be the male and female counterparts of each other and to be joined by a sloping surface 42 so arranged that when the bridging panel 15 is installed and pushed inwardly of the body, the interfit between the corresponding channels and tongues on the bridging panel and on both the side and front panels will cause the panels to draw together. Thus, the bridging panel serves the express purpose not only of transmitting shear loadings from the side to the front panels, but also of bringing them into exact alignment. The forming of complex shapes such as are presented by the tongues and grooves 41 and 40 respectively is a relatively simple procedure in materials of this type. They can either be formed by suitable cutting machinery after the panels have been fabricated or the panels may be initially manufactured to this shape, particularly where a foamed-in-place resin is employed. In this latter case, the resins will be foamed in a suitably shaped die to produce the desired tongue and groove arrangement.

Before the corner bridging panel 15 is installed, the exposed edge surfaces of the bridging panel 15 and of the side and front panels 11 and 13 respectively, are coated with a suitable adhesive normally one identical with that used for installing the splines 31. Sufficient adhesive is applied to assure an intimate bond between the panel structures throughout the entire surface area of the joint. The use of an irregularly shaped joint surface materially increases the total area of bond surface between the panels, thus contributing to the strength of the joint. Preferably, the grooves 40 in both the bridging panels 15 and in the panels to which they are joined are made somewhat deeper than the height of the ridges which they are designed to receive. This creates small pockets between the ends of the ridges and the bottoms of the corresponding grooves, making it possible to positively insert the bridging panels 15 to their full depth to obtain perfect alignment even though there may be an adverse accumulation of tolerances in the forming of the grooves and tongues. Sufficient adhesive should be applied to assure the formation of a bead 43 of adhesive completely filling these pockets.

A particularly high strength joint is illustrated in FIGS. 2 and 3. This joint structure is used for attaching the side assemblies 12 to both the roof assembly 11 and floor assembly 16. It is also described in detail in my co-pending application entitled Joint for Light Weight Laminated Panels, Serial No. 562,994, filed February 2, 1956. The strength of these joints is particularly important to the overall strength of the vehicle shell. The sides of the body shell act in unison and in co-operation with the floor and roof assemblies to prevent bending of the floor or roof structures longitudinally of the vehicle body. In this capacity they act as stiffeners in the same manner as an upturned flange acts as a stiffener at the edge of a piece of formed sheet metal.

If the vehicle body is a shell in which the roof is either omitted or disregarded as part of the structure, the sides in co-operation with the floor act in the same manner as a U-shaped channel with the floor constituting the web. Thus, the sides increase the moment of inertia of the structure to resist downward bending moments. When the front and rear panels 13 and 14 respectively are added to this structure, they act as members preventing inward convergence or collapse of the sides under such loading conditions. When the roof assembly is secured to the sides, the vehicle shell can then, for purposes of determining its resistance to bending moments, be considered as a hollow tube open at each end. In this case, the floor acts in tension, the roof in compression and the sides as webs, loaded in shear. Of course, it will be recognized that in a vehicle body moving over an irregular surface the severity and direction of this loading will sometimes change violently. However, the shell is so designed that it will withstand this type of momentary fluctuation of load characteristics. If the vehicle body is considered as a tube, the front and back panels act as stabilizing members or cross bracing to prevent an otherwise square or rectangular structure in cross section from becoming a parallelogram having enclosed angles other than 90 degrees.

Such a structure will provide a rigid shell of a monocoque type eliminating all necessity for a supporting frame structure. This invention is intended to provide a vehicle body of this type in which the shell itself serves as the sole load sustaining structure without support from an auxiliary frame either on the sides or beneath the floor. It is obvious that in such a structure the joints between floor and side assemblies and between the roof and side assemblies must not only be able to withstand the shear loads imposed by reason of the longitudinally acting bending moments but also the torque moments imposed by the tendency of the shell to rack sideways, that is, the movement of the roof laterally with respect to the floor.

Since the particular materials from which major portions of these panels are constructed, are characterized by high resistance to shear loads, as compared to their resistance to tension loads, the design of these corner structures should convert substantially all of the stresses at these corners to loads acting in shear. The particular joint structure illustrated in FIGS. 2, 3, 7 and 9 effects this purpose. Since the joint is similar at both the top and bottom of the vehicle shell, the plan view of the floor before installation of the side and front panels in FIG. 7 may be considered typical of both the floor and roof.

At suitable spacings along the edges of the floor assembly 16, slots 50 are formed in the core material 23 of the floor (FIG. 2). The depth of these slots is dependent upon the total shear loads it is desired to transmit to or from the core. The slots may be formed by any suitable means such as by routing. The slots 50 are arranged in pairs to receive the legs 65 of the U-shaped connectors 51, a typical example of which is illustrated in FIG. 10. The U-shaped connectors are first secured to the floor or roof assemblies by partially filling the slots 50 with the epoxy resin adhesive of suitable viscosity and then pressing the connector into the slots to the full depth of the slot. The depth of the slots 50 is such that the web of the connectors will be spaced slightly more than the thickness of the side wall panels from the edge face of the floor or roof panel. By this method of installation, the adhesive resin is positively forced from the bottom of the slot outwardly between the legs of the connector and the walls of the slot, assuring complete bonding throughout the entire surface areas exposed to each other. Sufficient time is then allowed to permit the resin to set. This firmly bonds the connectors to the floor and roof assemblies. The spacing of the connectors is dependent upon the anticipated loads, the size of the connectors, and the thickness of the panels of the floor, roof and side walls. It will be seen from FIG. 7 that the connectors are applied to the floor structure along both sides, the front and the corner bridging panels to provide an intimate connection throughout the entire length of the joint.

The connectors may be of any suitable material. However, a preferable material for the purpose of this invention is a connector made of the same material as that of the facing skins 22. That is, one or more laminations of woven filamentary glass entirely embedded in a cured polyester resin. The connectors may be of various thicknesses. For purposes of illustration, a connector having a thickness of 0.125 inch may be considered adequate for many applications. Such a connector will have an ultimate tensile strength of 40,000 p.s.i. and an ultimate shear strength of 18,000 p.s.i. Thus the two legs of a U-shaped connector, each having a thickness of 0.125 of an inch and a height of 2 inches, will develop 20,000 pounds in tension and 9,000 pounds in shear.

As initially installed to either the floor or roof assemblies. the connector projects from the edge of the assembly slightly more than the thickness of the panels of the side assemblies 12. To prepare the side assemblies for installation, a pair of parallel slots 52 opening through the end of the panels are cut or otherwise suitably formed in the panel for each of the connectors 51. These slots extend entirely through the thickness of the panel and in preparation for installation they are partially filled with the same adhesive used to bond the connectors to the core of the floor panel. The panels are then mounted by passing them down over the connectors until firm and intimate contact is made between the end of the side panels and the projecting flange portion 53 of either the floor or roof panels.

The projecting flange portion 53 (FIG. 3) consists of a portion of the skin and of the sublamina extending beyond the core of the floor panel to form a bottom on which the side panels may rest. In the case of the floor panels, it is the lower sublamina and skin which project to form the flange 53. In the case of the roof panels, it is the top sublamina and skin which project for this purpose. Among other things, the flange 53 provides an effective indexing means to determine the proper position of the wall panels with respect to the roof and floor panel.

Before assembly of the side panels to either the floor or the roof, all surfaces of the floor or roof panels coming in contact with the side panels are coated with an epoxy resin adhesive of the type previously described, particularly that type used for bonding the connectors 51. Thus, stress loads at the joint are transmitted not only along the lines of contact between the panels and the connectors but along the planes of surface contact between the panels themselves. The result is a large area of intimately bonded contact for the transmission of loads from one panel to the other.

The following tables are examples of the load carrying capacities of this type of joint. In each case the figures do not include the enclosing angle 56 which may, in some cases, further increase these figures. In these tables, the connectors 51 are considered to be of 0.125 of an inch thick, woven filamentary glass reinforced polyester resin. The spacing between the legs 65 of the connectors is 2 inches and the center to center spacing between the connectors is 9 inches. The adhesive employed is an epoxy resin, the viscosity of which has been increased by the addition of an extender. The adhesive is not only applied to the areas of contact between the connectors and the side panels but also to the areas of surface contact between the panels themselves.

This adhesive, when bonded to foamed, polystyrene having a density of 2 pounds per cubic foot, develops at normal room temperature an ultimate strength in shear of 43 pounds per square inch. This figure has been determined by tests in which a piece of filamentary glass reinforced polyester resin sheet was bonded to the foamed polystyrene by an epoxy resin. The assembly was subjected to tension loading parallel to the longitudinal axis of the strip until failure occurred as a result of rupture of the polystyrene adjacent the bond. The figures are based upon panels having a core of foamed polystyrene of a density of 2 pounds per cubic foot.

The figures in the following table are the values developed per foot of joint when the load is applied parallel to the lapping or side wall panel. The contribution to the joint's strength made by resistance of the flange 53 to deflection and delamination from the abutting panel (roof or floor) is disregarded in these figures.

TABLE VII

| Thickness of lapping panel [1] | Thickness of core of abutting panel [1] (height of anchor members) | | | | |
|---|---|---|---|---|---|
|  | 1″ | 2″ | 3″ | 4″ | 6″ |
| 1 | [2] 745.3 | 1,490.7 | 2,236 | 2,981.3 | 4,472 |
| 2 | 974.7 | 1,949.3 | 2,924 | 3,898.7 | 5,848 |
| 3 | 1,204.0 | 2,408.0 | 3,612 | 4,818.0 | 7,224 |
| 4 | 1,433.3 | 2,866.7 | 4,300 | 5,433.3 | 8,600 |
| 6 | 1,892.0 | 3,784.0 | 5,076 | 7,568.0 | 11,352 |

[1] Expressed in inches.
[2] Figures are maximum load, expressed in pounds, carried by a joint of 1 foot length.

The following table is based upon the same values as Table VII except that the loads are considered as being applied to the joint parallel to the abutting panels (roof or floor). The joint is considered as though the wedge 54 had been omitted and no value has been assigned to any contribution which might be made by the fact that one face of the lapping panel (wall) is bonded to the edge face of the abutting panel (roof or floor). This latter portion of the joint will act in tension.

TABLE VIII

| Thickness of lapping panel [1] | Thickness of core of abutting panel [1] (height of anchor members) | | | | |
|---|---|---|---|---|---|
| | 1″ | 2″ | 3″ | 4″ | 6″ |
| 1 | [2] 745.3 | 974.7 | 1,204 | 1,433.3 | 1,892 |
| 2 | 1,490.7 | 1,949.3 | 2,408 | 2,866.7 | 3,784 |
| 3 | 2,236.0 | 2,924.0 | 3,612 | 4,300.0 | 5,696 |
| 4 | 2,981.3 | 3,772.0 | 4,816 | 6,192.0 | 7,701.3 |
| 6 | 4,498.7 | 5,874.7 | 7,224 | 8,168.0 | 10,002.7 |

[1] Expressed in inches.
[2] Figures are maximum load expressed in pounds carried by a joint of 1 foot length.

For the purpose of determining the figures in the following table, the same conditions and values were used as in Table VII. However, Table IX expresses the load carrying capacity of the joint per lineal foot when the load is applied parallel to the axis of the joint. This type of loading, at failure, will result in sliding of the panels relative to each other. In computing these values no value was assigned to the strength of the connectors in shear since this would have introduced the complex factor of the ultimate values in bearing of the core materials when the bearing load may be non-uniformly distributed along the length of the connectors due to bending.

TABLE IX

| Thickness of lapping panel [1] | Thickness of core of abutting panel [1] (height of anchor members) | | | | |
|---|---|---|---|---|---|
| | 1″ | 2″ | 3″ | 4″ | 6″ |
| 1 | [2] 1,032 | 1,548 | 2,064 | 2,580 | 3,612 |
| 2 | 1,548 | 2,064 | 2,580 | 3,096 | 4,128 |
| 3 | 2,064 | 2,580 | 3,096 | 3,612 | 4,644 |
| 4 | 2,580 | 3,096 | 3,612 | 4,128 | 5,160 |
| 6 | 3,612 | 4,128 | 4,644 | 5,144 | 6,192 |

[1] Expressed in inches.
[2] Figures are maximum load expressed in pounds carried by a joint of 1 foot length.

After the panels of the side assembly 12 have been properly seated about the connectors 51, a wedge 54 (FIGS. 2 and 3) is driven between the web of each connector and the external face of the side panels. This forces the side panels into intimate contact with the exposed edge of the floor and roof assemblies, assuring a positive, high strength bond between these surfaces. Also, the use of the wedge eliminates the necessity for special holding jigs or clamping tools during the setting period of the adhesive. To prevent any possible mechanical injury to the internal apex of the joint and to seal it against penetration by chemicals or vapors, a bead 55 of the adhesive is formed at the joinder of the internal faces of the panels (FIG. 2). Again, it is desirable to use a highly viscous form of the epoxy resin for this purpose.

The entire joint is enclosed by a covering angle 56. The covering angle 56 is generally L-shaped and wraps entirely around the corner with one surface lying tightly against the bottom surface of the floor panel assembly 16 or the roof panel assembly 11, as the case may be. That portion of the covering angle 56 overlying the side panels entirely encloses the exposed ends of the connectors 51 and is offset at 57 so that its free end bears tightly against the exterior surface of the side panel assembly. A film of the adhesive is applied to the inside surfaces of the enclosing angle 56 to form an intimate bond between the angle and the external surfaces of the side panel assemblies 12 and either the floor or roof panel assembly, as the case may be. Since a certain amount of time is required to allow this adhesive to set, the angle may either be held in place by suitable jigs or clamps or it may be temporarily secured by blind rivets 58. The rivets 58 form a head on the inside surface of the outer sublamina. Once the resin adhesive has set, these rivets serve no structural purpose. Sufficient quantities of adhesives are applied to assure complete filling of the pocket 59 formed under the offset 57 and the pocket 60 at the external apex of the panels.

In certain constructions, these angles 56 may serve only as covering members and have no structural functions. In this case the adhesive bond between the angle and the panels may be omitted but caulking should be applied between the top of the angle and the face of the wall panels to prevent entrance of moisture. In this type of application the rivets 58 will serve as the attachment means for the angle.

Where the angles 56 are structural, the bond formed between the covering angles 56 and panel assemblies must be both an intimate and effective load transmitting union. This is particularly true in the case of the angles applied to the joint between the side panel assemblies 12 and the floor panel assembly 16, since, in this case, as will subsequently appear, the covering angles may serve the additional function of a means for attaching the primary supports such as the wheel bogey and the fifth wheel frame. To increase the load capacity of the covering angles 56 where they pass about a corner such as that formed between the front or side panels and the bridging panel 15, only the top or bottom leg is mitered to permit the bending of the angle. The side leg of the angle forms a band around the vehicle and acts as a hoop around at least a major portion of the perimeter of the vehicle shell.

While the use of the covering angles 56 as a band is one particular form of construction, it need not be employed. Along the rear of the body shell the covering angles may be omitted in the area of the hereinafter described reinforcing sheet 71. This will eliminate the necessity for offsetting the reinforcement sheet.

The covering angles 56 may be fabricated from any suitable material such as a fiber reinforced polyester resin of the type used for manufacture of the connectors 51 or they may be fabricated from aluminum, steel or any other suitable metal. Particularly in the case of the lower covering angle 56, the use of metal is considered preferable because it will facilitate the attachment of the frames for the supporting wheel bogey and the fifth wheel. This will be illustrated in more detail hereinafter.

A large proportion of the rear panel 14 of the body, particularly in the case of a truck semi-trailer, consists of an opening for the doors 70. This opening is of such proportions as to result in a serious reduction in the strength of the shell 10. To overcome this, the entire back face of the body shell is covered by a reinforcing sheet 71 (FIG. 1). While this sheet may well be formed of suitable metal such as stainless steel of about 0.125 inch thick, it may also consist of a rigid panel of filamentary glass reinforced, polyester resin similar in characteristics to the material from which the connectors 51 are fabricated. Irrespective of the material from which the back panel 71 is fabricated, its shape will be approximately the same. For purposes of illustration, it is considered to be a sheet of metal.

The marginal flanges 72 of the reinforcing sheet 71 are bent over to lay against the exterior faces of the wall panel assemblies 12 (FIG. 9). To assure a tight bearing against the wall assemblies, the marginal flanges 72 are offset to seat over the covering angles 56 at the top and bottom of the trailer, if the covering angles are extended to the end of the body shell. The top margin 73 of the reinforcing sheet is also flanged over to lay against the top surface of the roof panel assembly 11. The flange 73 is also offset to seat over the extra thickness of the covering angles 56, if they extend into this area.

The lower end of the reinforcing sheet 71 extends below the floor of the vehicle body forming a depending apron 74 having at its lower end a stiffening flange 75. The stiffening flange 75 is turned inwardly or forwardly. This prevents buckling of the sheet under lateral compression and shear.

The reinforcing sheet 71 is flanged inwardly at the opening for the doors 70 (FIG. 9). By turning the edges of the sheet into the door openings as well as flanging them against the sides and top of the body, substantial stiffening of the panel is effected. The result of this flanging is the formation of a U-shaped channel section on each side of the doors. The reinforcing sheet 71 is secured adhesively to the vehcle body in the same manner as are the corner angles 56. When it is not desired to use clamps or other pressure tools to hold the sheet during the curing period of the adhesives, the same type of blind riveting structure may be used as a temporary fastening means. In this case, the rivets will be located in the marginal flanges of the sheet securing it to the side wall and roof assemblies.

If it is desired to utilize the band effect with the reinforcement angles 56 but to discontinue them in the area of the reinforcement sheet 71, the side flange of each angle may be offset and extended over the reinforcement sheet 71. This will form a tab which may be secured to the reinforcement sheet 71 by riveting.

The vertical ends of the wall panels and the rear edge of the roof assembly 11 are each provided with a channel or cut out 76 opening through the interior and rear faces of the panels and having a depth of approximately half the thickness of the panel (FIG. 9). The end of the panel is enclosed by a generally Z-shaped angle 77 which is adhesively bonded to the edge of the panel enclosing the edges of the facing sheets, the sublaminae and the exposed edge of the core. A bead of plastic 78 at each end of the strip 77 is applied to reinforce the bond to the end of the panel. This type of bead structure is more clearly disclosed in co-pending application Serial No. 522,942 entitled Reinforced Corner for Plastic Sheets and Method of Making Same, filed July 19, 1955, now United States Patent No. 2,826,240, issued March 11, 1958. As will be clearly seen in FIG. 9, the reinforcing sheet 71 seats over one portion of the Z-shaped strip 77 to enclose it.

The doors 70 are of the same construction as the side panels, having a pair of facing skins 78, each bonded to a sublamina 79 which, in turn, is bonded to a low density, foamed core 80 (FIGS. 9 and 13). The marginal edges of the door panels are undercut to form a lapped edge designed to interfit with the channels 76 in the walls and roof. The door edges are enclosed by a Z-shaped strip 81 identical to the strip 77. A seal is provided between the doors and the shell by the compressible gasket 82. The gasket 82 is adhesively bonded to the end strip 77.

Where the doors meet at the center a lapped edge construction is also used with the edges enclosed by Z-shaped sections 82 as are employed at the outer margins of the doors. The joint between the doors is sealed by the compressible gasket 83.

The doors, being of the same material as the side wall, roof and door panels so far as basic structure is concerned, do not require a frame, being of themselves structural panels quite capable of sustaining the type of eccentric loadings to which such doors are commonly subjected. Doors of this construction withstand the racking and twisting loads commonly encounted in moving vehicles such as trucks or trailers, without appreciable change in shape such as sagging. Therefore, relatively close clearances can be maintained between the doors and the openings into which they fit without danger of interference between the two as a result of subsequent sagging or warping.

The doors are secured by hinges 84 attached to the rear panel 71 by suitable means such as screws or lags. These are threaded into the rear panel 71 after it has been provided with suitably tapped openings. The hinges are secured to the doors by bolts which thread into nuts embedded behind a suitable reinforcing clip which itself is adhesively secured to the door panel. The reinforcing clips 85 (FIG. 12) are U-shaped and are of the same type of material as the connectors 51. Their marginal legs 86 are seated in suitably formed slots in the door panel 70. The reinforcement clips 85 are secured to the panel by the same type adhesive as that used to bond the splines 31 and connectors 51. The hinges may be secured by rivets 87 as illustrated or by bolts engaging nuts which are pulled tightly against the back surface of the reinforcement clip 85. This type of attachment provides a rigid and exceptionally secure mount for the hinges. It is described in greater detail in copending application Serial No. 485,228 entitled Method and Means for Securing Fasteners to Low Density Core Panels, filed January 31, 1955, now United States Patent No. 2,898,258, issued August 4, 1959. It will be recognized that various other types of threaded fasteners may be used with the reinforcement clips 85 and that the particular type illustrated is merely exemplary.

It will also be recognized that various other arrangements may be used to provide a bearing block or plate for the fasteners securing the door hardware. It will also be recognized that various types of conventional latching hardware may be used to secure the doors in closed position. Again, any suitable structure may be used to provide anchorage for fasteners for this hardware.

One such arrangement consists in embedding a metallic or non-metallic plate in the core area of the door panels adjacent the exterior one of the sublaminae. This block is adhesively bonded both to the sublamina and to the core. It serves as the anchor means for the hardware fasteners and replaces the clip 85.

Where the vehicle body is designed to be a true monocoque structure and not to utilize any supporting frame, the wheel bogey 90 and the fifth wheel 91 are secured directly to the corner angles 56 along the lower side margin of the body (FIGS. 8 and 11).

In the truly monocoque type of vehicle shell construction in which all conventional frame structure is eliminated, both the frame 90 for the wheel bogey and the frame 91 for the fifth wheel may extend the full width of the body. In both cases, the frames are self-contained units so fabricated that they may be secured to the body structure as complete assemblies without the necessity of assembling the individual components of the bogey or fifth wheel frames as they are being installed on the vehicle body.

The exact structures of the frame assemblies 90 and 91 are not a part of this invention. The only important part of these frame assemblies, so far as this invention is concerned, is the fact that they are so constructed that they can be attached to the body, such as by anchoring to the corner angles 56. This attachment can be made in a number of different ways, one of which is specifically suggested in FIG. 8.

In this construction, in the area of both of the frames 90 and 91, the corner angle 56 is reinforced by a plate 92 which may be bolted to the corner angle 56 but preferably is welded to it, if both parts are of metal and are of metals suitable to welding. Where reinforcement plate 92 is of a non-metallic nature, it may be attached by means of adhesives or adhesives and fasteners. At the point where the cross members 93 of the wheel bogey and the cross members 94 of the fifth wheel frame are anchored to the corner angles 56, a further reinforcing plate 95 may be used. These are attached to the reinforcement plates 92 as by welding.

The ends of the cross members 93 and 94 are provided with gusset plates 96 to permit the installation bolts 97 to be arranged in a pattern of suitable size and more of them to be used for making the connection. Where the reinforcement plates 92 and 95 are utilized, the bolts 97 may be engaged in tapped holes in the plates. Where the plates 92 and 95 are non-metallic, special anchor nuts must be provided. It is, however, contemplated that the reinforcement plates 92 and 95 will be metallic and thus the tapped hole method of anchorage will be employed.

In this construction, the stresses resulting from the frames 90 and 91 are transmitted directly to the corner angles 56. Since the corner angles 56 are intimately bonded to the sides of the vehicle body, they will distribute these loads throughout the length of the vehicle. Thus, there will be no stress concentrations along the vehicle body.

The loads will be transmitted between the angles and the body structure in substantially equal amounts throughout the length of the body, thus preventing a concentration at any point. It will be recognized that the use of the gussets 96 and of a pair of beams for each one of the frames is for illustrative purposes only. Other frame designs could be used in connection with this invention with equal facility.

Figure 15:
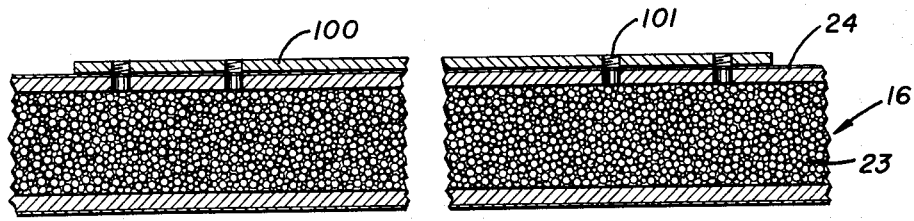
FIG. 15 is an enlarged, fragmentary, sectional view taken along the plane XV—XV of FIG. 14.

FIGS. 14 and 15 illustrate a modified arrangement for attaching either the fifth wheel frame or the wheel bogey. In this arrangement, the corner angles 56 are not used and accordingly may be made either structural or merely ornamental in purpose.

To mount either the wheel bogey or the fifth wheel frame, a plate 100 is adhesively secured to the bottom face of the floor panels 16. This plate may be of any suitable construction such as a relatively thick laminate of polyester and filamentary glass or a laminated structure consisting of various materials including filamentary glass reinforced polyester resins and one or more laminations of metal or wood. However, in the particular illustration, it is considered that the plate 100 is of metal whereby it will provide suitable bearing for the attaching bolts. For this purpose tapped holes 101 are provided in the plate for reception of the bogey or wheel frame attachment bolts. It will be recognized that the thickness of the plate will be dictated by the amount of bearing necessary to adequately support the attachment bolts. In part, this will be determined by the number of bolts utilized and the illustration of eight attachment bolts is to be considered as merely exemplary rather than a limitation upon this invention.

While the plate 100 may be of any suitable metal, it is preferably either zinc coated or stainless steel. Both types are characterized by high bearing strength and good corrosion resistance.

The plate 100 is illustrated as extending the full width of the trailer. This, again, is a matter of choice depending upon the loads expected and the designer's choice for attaching these items. As will be seen in connection with FIGS. 19 and 20, other arrangements are practical.

FIG. 16 illustrates a modification of the structure illustrated in FIGS. 14 and 15. In this case, instead of applying the attachment plate as a slab extending the width of the body, a pair of plates 102 and 102a are employed arranged longitudinally adjacent the sides of the trailer. The fore and aft length of the attachment plates 102 and 102a will be dictated by the degree to which it is desired to distribute the loads between the floor panels. Again, the plates 102 and 102a are secured by adhesives to the floor panels 16. Rather than providing tapped holes in the plates, the plates are shown as having suitable projecting threaded studs 103 which may be threadedly secured or welded to the plates 102 and 102a. The studs are arranged to correspond with suitable holes on either the wheel bogey or fifth wheel frames.

Figure 17:
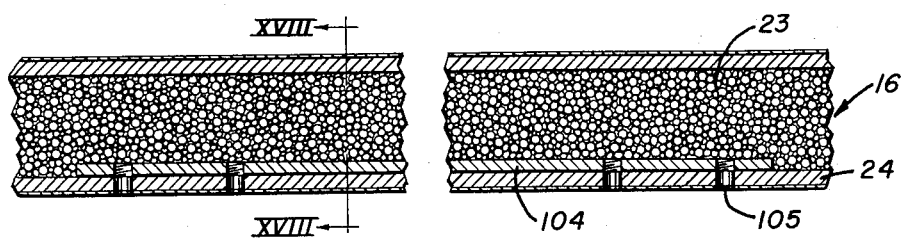
FIG. 17 is an enlarged, fragmentary, sectional view taken along the same plane as FIG. 15, illustrating a modified construction.

FIG. 17 illustrates another arrangement which may be used for securing the wheel bogey and the fifth wheel frame. In this case, a plate 104, such as a metallic plate, is inserted within the panel in the area of the core 23 either at the time the panel is fabricated or subsequently by removal of a portion of the core and the insertion of the plate. After the plate has been mounted, suitable holes are drilled through the facing and sublaminae of the floor panels 16 and into the plate 104. The plate portion of the holes 105 are tapped for reception of the installation bolts. This arrangement has the advantage of enclosing the plate within the panel where it is protected against corrosive agents. It will be recognized that for the plates 100, 102 or 104 a built up laminated reinforced synthetic resin material may be substituted for metal and suitable threaded fasteners may be embedded in the material for the attachment of the installation bolts.

Figure 18:
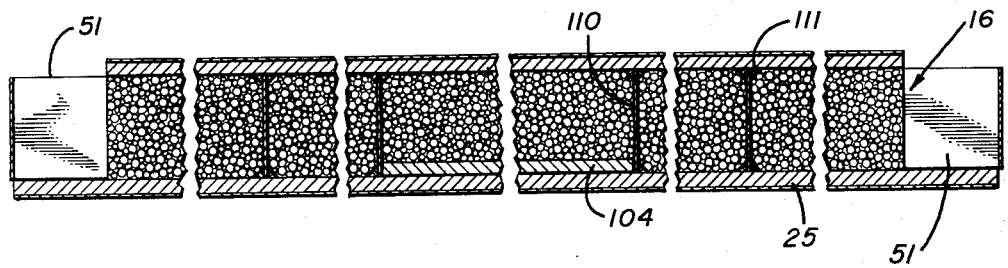
FIG. 18 is an enlarged, fragmentary, sectional view taken along the plane XVIII—XVIII of FIG. 17.

FIG. 18 illustrates the cross bracing which may be applied within the panel. To brace the panel, a plurality of vertical ribs 110 are placed in the core. These extend laterally of the floor and contact the sublaminae 25 on both sides of the core. These ribs may be of a rigid, filamentary glass reinforced polyester resin of 0.90 of an inch thickness. Other thicknesses may be used, depending upon the loads imposed. The ribs are adhesively bonded to the sublaminae 25 and these joints may be reinforced by a bead 111 on each side of the rib. For this purpose, epoxy resin type adhesives are preferable to the contact type because of their superior strength and hardness. Where the ribs 110 contact the plate 104 they are bonded to the plate in the same manner as to the sublaminae 24.

FIGS. 19 and 20 illustrate a further construction which may be employed for attachment of the fifth wheel and wheel bogey frames. In the figures the structure is shown as it is applied to the fifth wheel frame.

In this arrangement a panel 115 of special construction is used in the floor assembly 16 in the area of the fifth wheel frame attachment. The panel 115 has filamentary glass reinforced, polyester resin facing skins 116 on both surfaces. These skins 116 are each bonded to a first sublamina 117, of metal, which in turn are each bonded to a second sublamina 118 of plywood. The interior body of the panel consists of a core 119 of foamed polystyrene bonded on each face to one of the second sublaminae 118.

Without limiting the invention to the specific thicknesses and materials, in a typical construction, the facing skins 116 are of 0.018 of an inch thickness. The first sublaminae 117 consist of 20 gauge, zinc coated steel. The second sublaminae are of ⅜ of an inch fir plywood The core consists of closed cell, expanded polystyrene of 4.5 pounds per cubic foot density.

Mounted in the core area of the panel 115 and securely bonded to the inner faces of each of the second sublamina are two, laminated reinforcing plates 120 and 120a, one adjacent the top and one adjacent the bottom of the panel. The plates each consists, in this particular illustration, of a 0.50 of an inch thick fir plywood layer 121, and a 0.25 of an inch thick steel plate 122. While the size of the plates 120 and 120a will vary according to the magnitude of the loads to be distributed, a plate of approximately 12 x 18 inches will work satisfactorily for many applications.

In the reinforcement plate 120, the plywood layer 121 is adjacent the second sublamina 118 and is bonded thereto. In the reinforcement plate 120a, the steel plate 122 is adjacent the second sublamina and bonded thereto. The steel plates 122 provide bearing support for the hereinafter described bearing 123 and the arrangement described provides maximum spacing along the bearing 123 between the steel plates 122.

A bearing 123 opening through the bottom surface of the panel 115 extends through the panel with its upper end seated in the blind opening 124 in the upper plate 120. The bearing 123 is centered in the plates 120 and 120a and is preferably press fitted in both.

A bearing slab 125 is applied to the bottom external face of the panel 115. This slab 125 is substantially larger than the plates 120 and 120a. In the particular structure illustrated, the slab 125 is an 0.25 of an inch thick sheet of stainless steel having outside dimensions of approximately 36 x 48 inches. The slab 125 is securely bonded to the lower facing skin 116 and further secured by screws 126. Those of the screws 126 in the area of the reinforcement plate 120a extend into the reinforcement plate and engage tapped openings in the steel plate 122. Those of the screws 126 located beyond the margins of the reinforcement plate 120a are of the wood screw type and engage the wooden second sublamina 118.

The slab 125 has a central hole aligned with the bearing 123 through which passes the king pin 127. The king pin is secured to the slab 125, before assembly of the slab to the panel, by welding. The king pin itself is of conventional design.

The panel 115 is internally braced with ribs 128 extending through the core and contacting both second sublaminae 118. The ribs 128 extend laterally of the trailer body to strengthen the floor in shear and bending. The ribs are bonded on each of their faces to the core 119. They are also bonded along their edges to the second sublaminae 118. At this latter bond beads 129 of adhesive are formed on each side of the ribs to further reinforce this joint.

In the particular illustration of this floor panel, the ribs are of 0.090 of an inch filamentary glass reinforced, polyester resin. It will be recognized that other materials and other thicknesses may be used, if required.

The various components making up the panel 115 and the king pin supporting structure must withstand severe stresses. Accordingly, for the purpose of bonding together the laminates of the panel, for attachment of the plates 120 and 120a, for attachment of the bearing slab 125, for attachment of the ribs 128 to the core and second sublaminae and formation of the beads 129 an epoxy type resin is preferable. This epoxy resin adhesive will be the same as that described earlier as one of the resins useful for bonding together the laminae of the roof and wall panels. The epoxy based adhesives cure to a hard, rigid film which will not fail under sever vibration or shear loads and will not permit creep between the various components.

Panels of the type of panel 115 and having the same fifth wheel attachment structures associated therewith should, with a bearing slab 125 of 36 inches square, with an adequate margin of safety, withstand 25,000 pounds vertical loading. It should also withstand 12,000 pounds of horizontal loading both longitudinally and laterally with an adequate margin of safety.

It will be recognized that with minor modifications to adapt the above structure to the characteristics of the wheel bogey frame, that it may also be used for this purpose. When special panels 115 are used, in the area of attachment of the fifth wheel and wheel bogey frames, the remaining panels of the floor assembly are of the type described earlier without metal or rib reinforcement.

This type of structure has several advantages in the areas of attachment of the wheel bogey and fifth wheel frame. Particularly in the area of the fifth wheel attachment it permits the vehicle body to be fully insulated. In conventional constructions so much frame structure had to be provided at this point that thermal insulation of the floor had to be wholly or substantially eliminated if the interior surface of the floor was to be kept flat. It also eliminates the necessity for a step in the body structure at the fifth wheel. This creates additional space for thermal insulation. The same advantages are obtained in the area of the wheel bogey but to a somewhat less marked degree.

This structure provides a vehicle construction in which the frame components conventionally employed to support the body of the vehicle can be eliminated. While it is recognized that this material will sometimes be used in connection with a supporting frame beneath the floor, it should also be recognized that it is specifically designed for use without such a frame. The material, by its very nature, permits this to be done. Each of the panels is structural and, as seen in the foregoing Tables I through VI, is capable of withstanding a high load factor without such deflection as will result in functional difficulty and with a wide margin of safety so far as its shear and ultimate tensile strengths are concerned.

While these materials are fabricated in individual panels and are assembled as modular units to make up the floor, walls, and roof of the body, this does not detract from the overall strength of the unit since the panels are joined adhesively. In this type of joint, the loads are transferred from one panel to the other throughout both the length and thickness of the joint. This eliminates the concentration points characteristic of the use of conventional fasteners such as bolts, rivets and screws. Furthermore, such joints will automatically result in a balancing of the loads as they are transmitted from one panel component to another. Thus, all areas of the structure become evenly and equally stressed. This permits the structural characteristics of the body to be used to a much higher degree than is possible in conventional constructions.

The thickness of the particular panels selected for a vehicle shell will, of course, depend upon the expected loads and operating conditions. The figures in the following paragraphs reflect the requirements for a 24 foot trailer of 8 foot width, designed for use as a conventional highway semi-trailer for refrigerated goods. In such a body the wall and ceiling panels of 2¼ inch thickness and floor panels of 3¼ inch thickness provide an adequate structure. This structure will withstand not only the vertical bending loads imposed upon the shell by reason of the pay load within the body but will also withstand the racking loads incident to the trailer's movement over uneven surfaces resulting in a torque moment being generated approximately about the longitudinal centerline of the shell. The wall panels for such a trailer consist of a 2 inch thick core of 2 pounds per cubic foot density, foamed polystyrene to each face of which is bonded a ⅛ of an inch thick, hardwood, veneer sublaminate. The outer faces consist of 0.018 of an inch thick skins of cured polyester resin reinforced with a woven filamentary glass cloth. The floor panels are identical to the wall panels except for an additional one inch thickness in the core and for special bracing at the attachment panels of the fifth wheel and wheel bogey frames.

Despite the strength of such a body, the overall weight is considerably less than that of conventional constructions. Since the 2¼ inch panel weighs approximately 1.64 pounds per square foot and the 3¼ inch panel weighs approximately 1.81 pounds per square foot, the total weight of a vehicle body of 24 foot length, 8 foot width and 8 foot height will be only 1502 pounds plus the weight of the reinforcement plates and other hardware ultimately attached to the body. This low weight characteristic results in a higher pay load for the vehicle body. An important feature of the use of this material is that this weight advantage is permanent. In conventional constructions, particularly where they are used for refrigerated vehicles, the accumulation of moisture over months or years results in a substantial increase in the weight of the body. This is not true of this material since its water impervious and non-hygroscopic characteristics prevent this accumulation. This alone, over a period of time, results in a substantial increase in the earning capacity of the vehicle.

As will be seen from Tables I and II, the material has a very favorable K factor making it particularly suitable for refrigerated vehicle bodies. The material's resistance to accumulation of moisture and moisture vapor assures the retention of the value of this K factor throughout the life of the vehicle body. This is an important improvement in retaining the efficiency of the body.

It will be seen from this description that both from a structural and from a functional point of view, vehicle bodies constructed according to this invention and of the materials contemplated in this invention have many advantages over conventional constructions. There are various other advantages to the use of these materials, particularly for specialized purposes.

While a preferred construction and various modifications of this construction have been disclosed, it will be recognized that other modifications may be employed. Each of these modifications which is within the principle of the invention is to be considered as included in the hereinafter appended claims unless the claims, by their language, expressly state otherwise.

We claim:

1. A vehicle body having walls, a floor and a roof, said body consisting of: a plurality of panels comprising a low density synthetic resin core and a pair of synthetic resin facing skins joined to each face of said core, said panels being adhesively joined together for forming said walls, floor and roof of said body, said walls, floor and roof being adhesively joined together to provide a rigid, frameless, load carrying shell open at one end, a rigid sheet adhesively bonded to said open end, said sheet being flanged to overlie a portion of both the inner and outer surfaces of the side walls of said shell, said sheet having an apron portion depending below said shell and said apron portion having stiffening means at its lower end.

2. A vehicle body having walls, a floor, a roof and a frame for ground supporting wheels, said vehicle body comprising a plurality of panels of laminated synthetic resin, said panels being adhesively joined together for forming said walls, floor and roof of said body, said walls, floor and roof being adhesively joined together to provide a rigid, frameless, load carrying shell, metallic angles wrapped about the joint between said walls and floor, one of said angles being on each side of said shell, adhesive means bonding said angle to the exterior surfaces of said shell and means for securing the frame to said angles.

3. A vehicle body having walls, a floor, a roof, a frame for ground supporting wheels and a frame for a fifth wheel, said vehicle body comprising a plurality of panels of laminated synthetic resin, said panels being adhesively joined together for forming said walls, floor and roof of said body, said walls, floor and roof being adhesively joined together to provide a rigid, frameless, load carrying shell, metallic angles wrapped about the joint between said walls and floor, one of said angles extending longitudinally of said shell on each side thereof, adhesive means bonding said angles to the exterior surfaces of said shell and means for securing each of said frames to said angles.

4. A vehicle body consisting of a plurality of panels comprising a laminated synthetic resin, each panel having a foamed synthetic resinous core, a compression resistant layer adhered to each side surface of said core and synthetic resinous facing skins adhered to the surface of each said compression resistant layer, said panels being adhesively joined together, a spline overlapping the line of juncture of each said pair of panels, said spline comprising a foamed synthetic resinous core and a compression resistant layer adhered to each side surface of said spline core, all abutting surfaces of said panels and said splines being connected by a layer of adhesive.

5. In a vehicle body construction having side and end walls consisting of a plurality of panels, each panel having a foamed synthetic resinous core, a compression resistant layer adhered to each side surface of said core and facing skins adhered to the surface of each said compression resistant layer, the joint between said side and end walls being formed of a bridging panel of the same structure as said side and end wall panels, the edge surfaces of said side and end wall panels being grooved so as to form a substantially Z-shaped contour thereon, the mating surfaces of the said bridging panel having correspondingly grooved surfaces and said bridging panel being adhered to said side and end wall panels to form a rigid corner assembly.

References Cited in the file of this patent

UNITED STATES PATENTS

| | | |
|---|---|---|
| 1,289,308 | Thornton | Dec. 31, 1918 |
| 2,242,269 | Siebler | May 20, 1941 |
| 2,382,376 | Black | Aug. 14, 1945 |
| 2,459,765 | Black | Jan. 18, 1949 |
| 2,459,766 | Black | Jan. 18, 1949 |
| 2,471,917 | Wilson | May 31, 1949 |
| 2,528,818 | Brown et al. | Nov. 7, 1950 |
| 2,612,964 | Hobbs | Oct. 7, 1952 |
| 2,728,702 | Simon et al. | Dec. 27, 1955 |
| 2,730,772 | Jones | Jan. 17, 1956 |
| 2,731,682 | Evans | Jan. 24, 1956 |
| 2,744,042 | Pace | May 1, 1956 |
| 2,803,856 | Kofahl et al. | Aug. 27, 1957 |
| 2,858,580 | Thompson et al. | Nov. 4, 1958 |

FOREIGN PATENTS

| | | |
|---|---|---|
| 546,686 | Great Britain | July 27, 1942 |

OTHER REFERENCES

"Plastic Trailers," article in "Automotive Industries," Jan. 1, 1954, pages 64, 65 and 122.